UNITED STATES PATENT OFFICE.

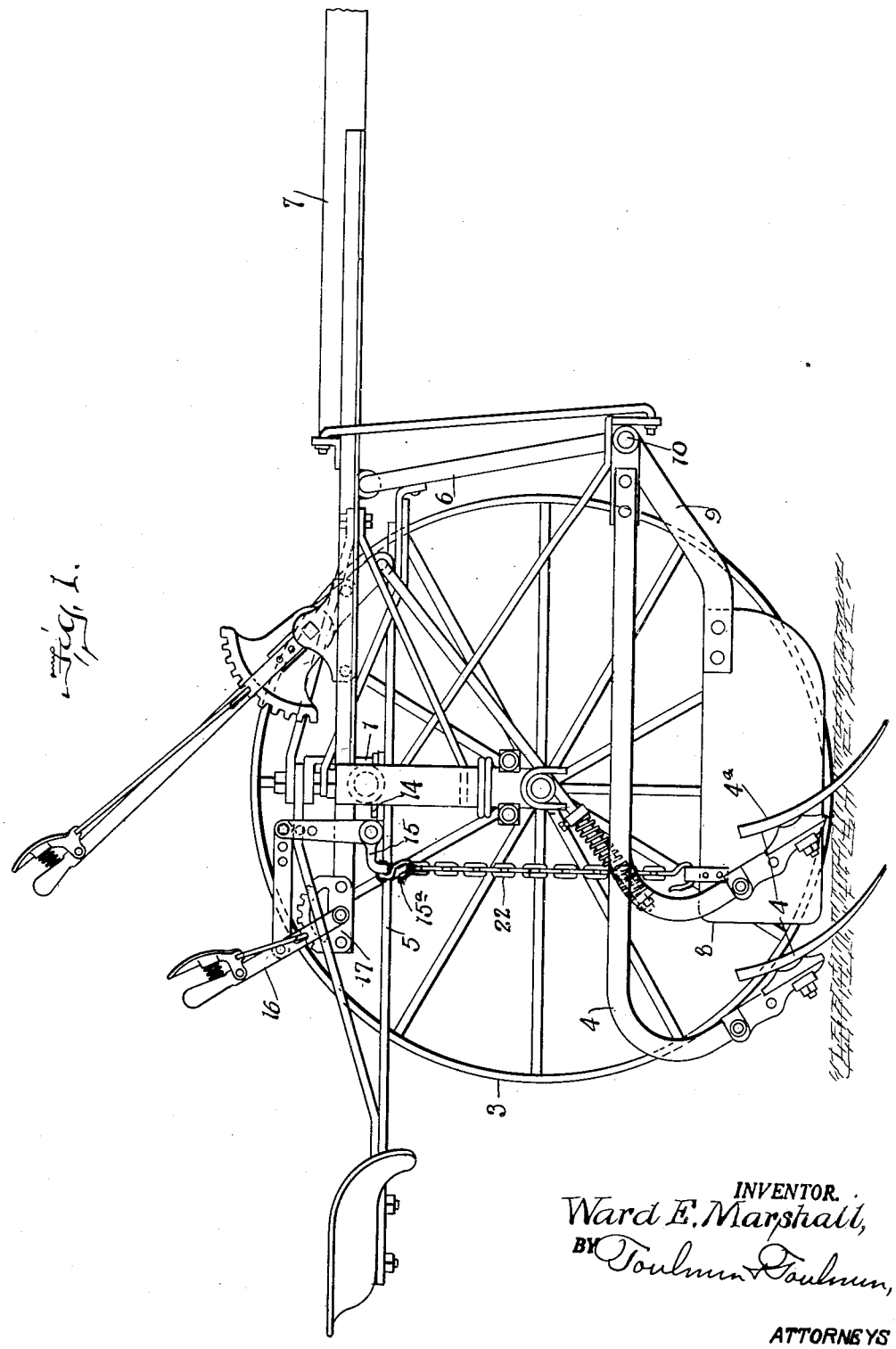

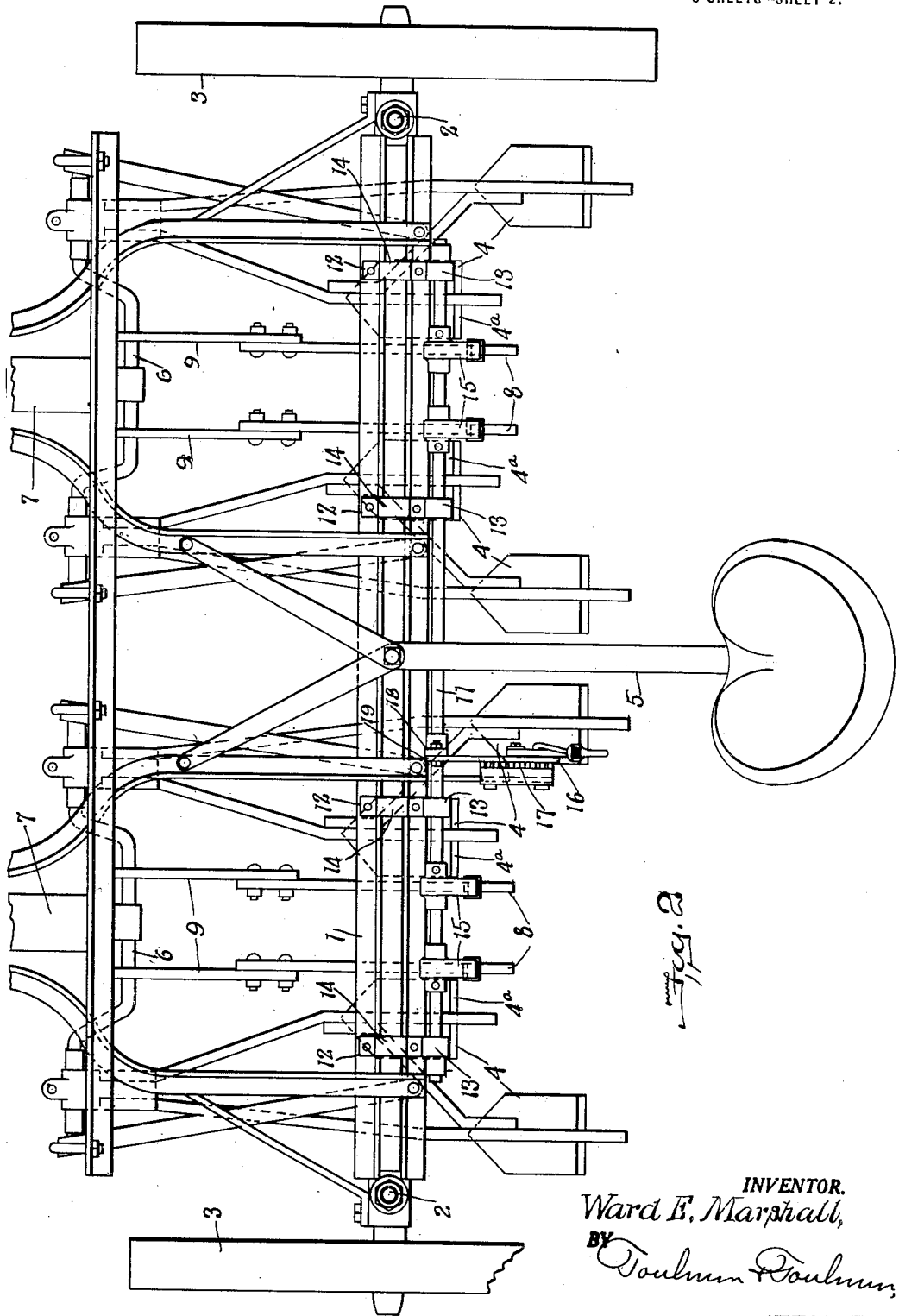

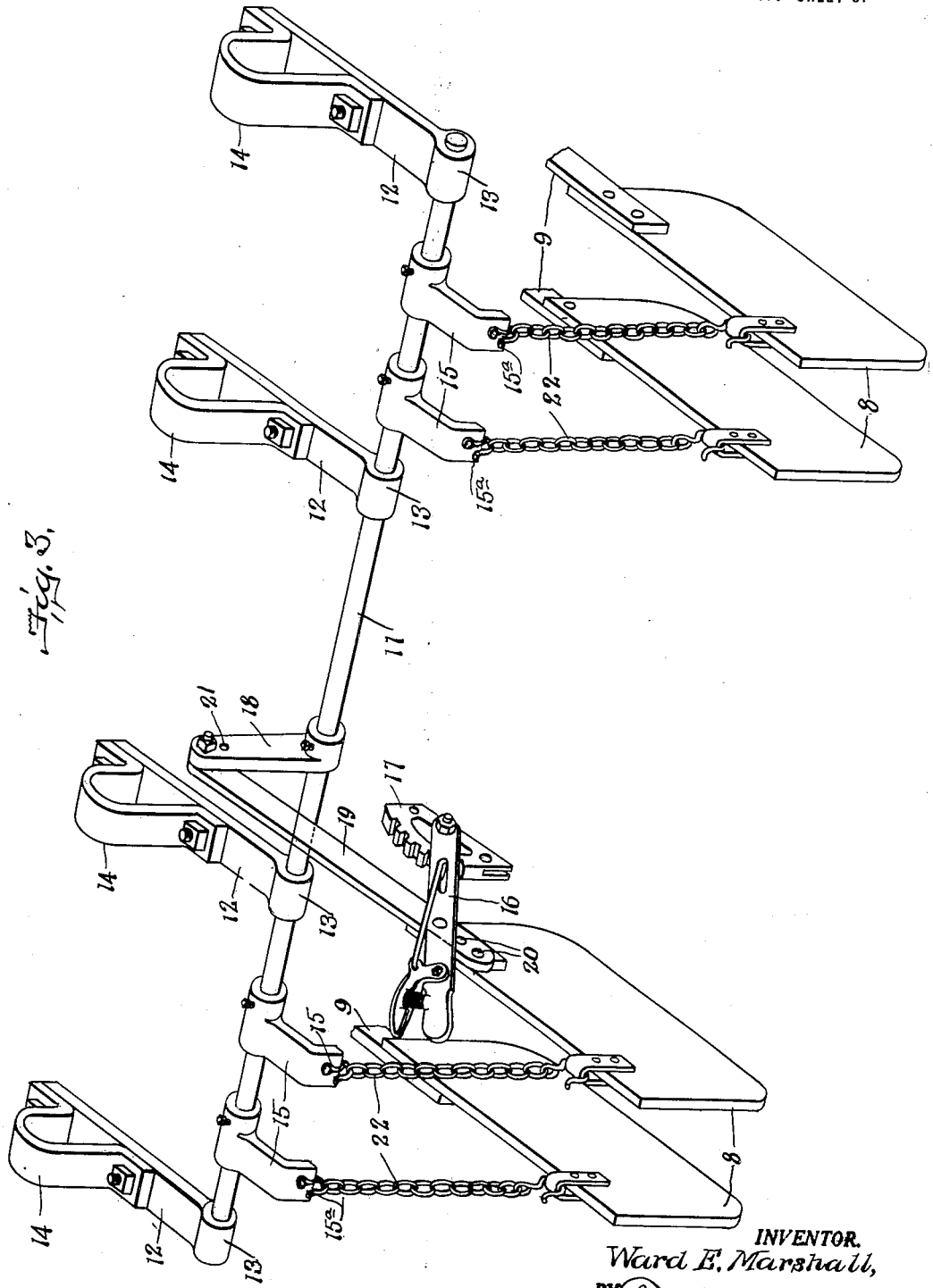

WARD E. MARSHALL, OF NEAR BROOKVILLE, OHIO.

CULTIVATOR.

1,337,407. Specification of Letters Patent. Patented Apr. 20, 1920.

Application filed September 2. 1919. Serial No. 320,989.

*To all whom it may concern:*

Be it known that I, WARD E. MARSHALL, a citizen of the United States, residing near Brookville, in the county of Montgomery and State of Ohio, have invented certain new and useful Improvements in Cultivators, of which the following is a specification, reference being had therein to the accompanying drawing.

This invention relates to improvements in cultivators and has particular reference to means for instantly and simultaneously adjusting the cultivator fenders or guards relative to the gangs to adapt the same to the plants and condition of the soil.

It has been common practice heretofore to attach the cultivator fenders in vertically pivotal relation to the gangs, the fenders being pivoted to the gangs at their forward ends by means of suitable arms or extensions, and floating free at their rear ends, thus adapting the same to the condition of the soil being cultivated and enabling the fenders to rise clear of any obstructing matter, such as stones, clods or roots with which they may come in contact. The fenders also in the usual form of construction are made of light material, such as sheet steel, and therefore are more or less flexible laterally, thus permitting the parts to yield sufficiently to enable stones or clods or other obstructing matter to pass between the fenders and the gangs.

It has also been common practice to provide means for adjusting the fenders, before beginning work, relative to their elevation from the ground or to the depth of the gangs. That is to say, adjustable means have been provided for setting the fenders at a given elevation from the ground and also to adjust their angular relation relative to the gangs. Thus in cultivating soil having small growing plants the fenders may be set slightly above the ground or may even contact with the ground to prevent the soil moving upwardly from the plows or shovels, covering the plants. And, obviously, where the plants are larger the fenders may be set correspondingly higher to permit the soil to move more freely about the plants. This adjustment may also be influenced more or less by the character or condition of the soil to be cultivated.

However, as far as I am aware, no provision has been heretofore made to adjust the fenders simultaneously and at the will of the operator to the variable size of the plants and variable condition and character of the soil, such as will be found in the average field of growing corn or other plants requiring cultivation. It is well known that growing field plants vary greatly in size as may be determined by variations of the soil relative to its nature and fertility, or as may be caused by earlier or later plantings, or by replanting where seed has failed to come up or earlier plants have been destroyed.

The main object of my invention, therefore, is to provide means for mounting and regulating the fenders of a cultivator so that their adjustment relative to the ground and cultivator gangs will be under the immediate control of the operator, the fenders being raised or lowered at will to adapt the same to the variable size of the plants or the variable soil, as may be determined by the judgment of the operator.

The utility and importance of my invention will be obvious to the experienced operator of farm cultivators of this character. As far as I am aware I am the first to apply the principle of direct adjustable control to cultivator fenders, and I wish to claim my invention broadly and comprehensively therefore as defined in the appended claims. It will be understood, of course, that the invention in the specific form herein shown is adapted to a well known type of cultivator, and that the details of construction may be changed or modified to adapt the invention to other types of cultivators without departing from the underlying principle and purpose of the invention. As here shown the invention has been applied to a two-row cultivator, but it is obvious that in suitable form it is equally adaptable to a one-row cultivator.

In the accompanying drawings:

Figure 1 is a side elevation, partly in cross section, of a two row cultivator of a well known type having my improved fender attachment applied thereto;

Fig. 2 is a plan view of the cultivator shown in Fig. 1; and

Fig. 3 is a perspective assembly view of the cultivator fender controlling mechanism detached.

The invention is here shown as applied to a two-row cultivator of a well known commercial type, being of the pivot-axle, seat-guide construction, and consisting of the usual frame 1, vertical pivot axles 2—2, wheels 3—3, opposite pairs of double gangs 4—4, pivoted seat lever 5, front supporting and guide arches for the gangs 6—6 and opposite poles or shafts 7—7. These are the main features of construction, the complete cultivator being made up of numerous additional details of construction which do not require specific enumeration in the description of the present invention.

As shown in the several figures of the drawings my improved construction consists in the opposite fenders which are arranged in pairs or sets, one for each pair of gangs, the fender for each gang being adjusted relative to the inner shovel of the gang which is nearest to the row of plants when the cultivator is in work.

The construction and means of adjustment of the separate fenders is identical except that the opposite fenders of each set may be made for right and left hand connections, but this is not essential as the fenders may be made interchangeable. The details of construction relating to one fender, therefore, will apply to all the fenders.

Each fender may consist of a suitable plate of sheet metal 8 arranged vertically adjacent to the inner shovel 4ᵃ of the gang 4, the front end of the fender extending substantially beyond the shovel forwardly and the rear end of the fender extending a greater distance beyond the shovel rearwardly. The front end of the fender may be connected to the gang by any suitable pivot connection, as by means of the forwardly extending arm 9 and pivot 10, so that each fender may operate freely in a vertical plane relative to the shovel 4ᵃ independently of the gang 4 but operating with the gang in the raising and lowering thereof relative to the work.

The foregoing description relates to fenders of common construction, the details of which form no part of the present invention except as used in combination with the improved construction.

The present invention consists in providing means to adjust all the fenders simultaneously relative to their elevation from the ground to the gangs without interfering with the normal free action of the fenders.

To this end, as here shown, a suitable shaft 11 is arranged transversely of the cultivator frame supported in bearings 13 of brackets 12 which are secured to the frame by strap irons 14; the shaft 11 rotating freely in the bearings 13. Secured to the shaft 11 in any suitable manner to permit of adjustment thereof longitudinally of the shaft and rotating therewith are arms 15 having secured thereto at their rearward ends adjusting hooks 15ᵃ. The shaft 11 is operated by means of a ratchet lever 16 coöperating with a ratchet 17, located conveniently to the operator and connected to an operating arm 18 secured to the shaft, by an adjustable link 19, holes 20 being formed in the link 19 and holes 21 in the operating arm 18 to effect the adjustments of the shaft 11 relative to the ratchet lever 16.

The rear ends of the fenders 8 are connected to the hooks 15ᵃ and thus through the arms 15 to the shaft 11, by chains 22, the working length of which may be lengthened or shortened as desired to determine the elevation of the fenders relative to the gangs or shovels by adjusting the links relative to the hooks 15.

From the foregoing detailed description of construction the operation of my improved fenders, which is the whole purpose of my invention, the details of construction in whatever form employed being merely the means to the accomplishment of this purpose, will be apparent to those experienced in this art. It will be seen that the fenders are free to function normally as under the old construction but that all the fenders are immediately under the control of the operator and may be raised or lowered at will by a single adjusting lever to adapt the same to the variable size of the plants or condition of the soil. Obviously, of course, the fenders may be raised by operating the adjusting lever to free them of any obstructing matter, such as clods, stones or weeds which may be lodged against them.

Having thus fully described my invention, what I claim as new and desire to secure by Letters Patent, is:—

1. In a cultivator, the combination, with gangs, of fenders operable relative to said gangs, a plurality of supporting brackets detachably mounted on the cultivator frame, a shaft rotatively supported relative to the cultivator frame, a lever having adjustable connections with said shaft and operable to a plurality of predetermined positions, and connections between the fenders and said shaft, whereby the fenders may be raised or lowered to a corresponding plurality of predetermined positions.

2. In a cultivator, the combination, with gangs, of fenders operable relative to said gangs, an operable member supported upon and extending transversely of the cultivator frame and having a plurality of radially adjustable arms, one for each fender, secured thereto, an operating element for said member, and connections between the fenders and said arms whereby the fenders may be simultaneously raised or lowered relative to the gangs.

3. In a cultivator, the combination, with gangs, of fenders operable relative to said gangs, supporting brackets secured detachably to the cultivator frame, an operable member supported in said brackets and extending transversely of the cultivator and having a plurality of radially extending arms, and connections between the fenders and the arms and an operating element whereby the fenders may be simultaneously adjusted relative to said gangs.

4. In a cultivator, the combination, with gangs, of fenders operable relative to said gangs, supporting brackets secured detachably to the cultivator frame, an operable member rotatively supported in said brackets and extending transversely of the cultivator, and adjustable connections between the fenders and said operable member, and an operating element whereby the fenders may be simultaneously adjusted relative to said gangs.

5. In a cultivator, the combination, with gangs, of fenders operable relative to said gangs, a plurality of supporting brackets secured to the cultivator frame and extending parallel with each other substantially in a horizontal plane rearwardly of the axle, an operable member rotatively supported in said brackets and extending transversely of the cultivator, and connections between the fenders and said operable member, and an operating element, whereby the fenders may be simultaneously adjusted relative to said gangs.

6. In a cultivator, the combination, with gangs, of fenders operable relative to said gangs, supporting brackets secured detachably to the cultivator frame and extending rearwardly thereof, an operable member supported in said brackets and extending transversely of the cultivator and having a plurality of rearwardly extending arms adjustably supported thereon, and connections between the fenders and the arms and an operating element, whereby the fenders may be simultaneously adjusted relative to said gangs.

In testimony whereof, I affix my signature.

WARD E. MARSHALL.